United States Patent

Pakusch et al.

[11] Patent Number: 6,028,167
[45] Date of Patent: Feb. 22, 2000

[54] USE OF PHENOLSULFONIC ACID-FORMALDEHYDE CONDENSATION PRODUCTS AS DRYING AIDS

[75] Inventors: Joachim Pakusch, Ludwigshafen; Maximilian Angel, Schifferstadt; Joachim Roser, Mannheim; Andree Dragon, Speyer; Heinrich Sack, Hassloch, all of Germany

[73] Assignee: BASF Aktiengesellschaft, Ludwigshafen, Germany

[21] Appl. No.: 09/147,555

[22] PCT Filed: Jul. 21, 1997

[86] PCT No.: PCT/EP97/03929

§ 371 Date: Jan. 20, 1999

§ 102(e) Date: Jan. 20, 1999

[87] PCT Pub. No.: WO98/03576

PCT Pub. Date: Jan. 29, 1998

[30] Foreign Application Priority Data

Jul. 22, 1996 [DE] Germany .................. 196 29 526

[51] Int. Cl.[7] .................. C08K 3/00; C04B 16/04; C04B 24/22; C04B 24/30; C08G 8/18

[52] U.S. Cl. .................. 528/502 E; 524/3; 524/5; 524/6; 524/8; 528/487; 528/491; 528/493; 528/502 E

[58] Field of Search .................. 524/3, 5, 6, 8; 528/487, 491, 493, 502 E

[56] References Cited

U.S. PATENT DOCUMENTS

| | | | |
|---|---|---|---|
| 3,784,648 | 1/1974 | Bergmeister et al. | 524/3 |
| 5,225,478 | 7/1993 | Beckerle et al. | 528/150 |
| 5,342,916 | 8/1994 | Weiser et al. | 528/150 |
| 5,498,665 | 3/1996 | Schulze et al. | 525/57 |

FOREIGN PATENT DOCUMENTS

| | | |
|---|---|---|
| 24 45 815 | 4/1976 | Germany . |
| 078 449 | 10/1982 | Germany . |

*Primary Examiner*—Peter A. Szekely
*Attorney, Agent, or Firm*—Oblon, Spivak, McClelland, Maier & Neustadt, P.C.

[57] ABSTRACT

Phenolsulfonic acid-formaldehyde condensates are used as assistants in the drying of aqueous polymer dispersions.

Also described are a process for preparing polymer powders by drying, using these condensates; the polymer powders obtainable by the process; and their use as binders.

15 Claims, No Drawings

USE OF PHENOLSULFONIC ACID-FORMALDEHYDE CONDENSATION PRODUCTS AS DRYING AIDS

The present invention relates to the use of phenolsulfonic acid-formaldehyde condensation products (condensates) as drying assistants, especially in connection with the spray drying of aqueous polymer dispersions.

The present invention also relates to a process for preparing polymer powders which are redispersible in an aqueous medium, and to the redispersible polymer powders and their use.

Aqueous polymer dispersions are widely employed, for example as binders, especially for synthetic-resin renders or highly pigmented interior paints, adhesives or other coating compositions. In many cases, however, it is desired to use not the aqueous polymer dispersion but the polymer in powder form.

To obtain the polymer in powder form, the dispersion must undergo a drying operation, for example spray drying or else freeze drying. In the case of spray drying, the polymer dispersion is sprayed in a stream of hot air and the water is removed; the air used for drying, and the sprayed dispersion, are preferably passed cocurrently through the dryer.

However, the resulting polymer powder has the disadvantage that its redispersibility in an aqueous medium is generally not entirely satisfactory, since the polymer particle diameter distribution which results from redispersion generally differs from that in the initial aqueous dispersion. The reason for this is that aqueous polymer dispersions, unlike polymer solutions, do not form thermodynamically stable systems. Instead, the system tends to reduce the polymer/dispersion interface by combining small primary particles to form larger secondary particles (gel specks, coagulum). In the state of disperse distribution in the aqueous medium, this can be prevented even for a relatively long time by the addition of dispersants, such as emulsifiers and protective colloids. During the drying of aqueous polymer dispersions, however, the action of the dispersants is in many cases inadequate, and irreversible formation of secondary particles takes place to a certain extent, ie. the secondary particles are retained on redispersion and impair the performance characteristics of the aqueous polymer dispersion that are obtainable on redispersion.

To prevent or at least reduce the formation of secondary particles in the course of drying, it has long been known to employ drying assistants. These substances are widely referred to as spray assistants, since spray drying in particular promotes the formation of irreversibly agglomerated secondary particles. This effect is all the more marked the lower glass transition temperature (and thus the softening point or minimum film-forming temperature) of the polymer particles, especially when it is below the drying temperature. At the same time, drying assistants generally reduce the formation of polymer coating which remains adhering to the dryer wall, and thus result in an increase in powder yield.

The use of drying assistants is known from numerous publications. For instance, DE-A-24 45 813 describes a pulverulent polymer which is redispersible in aqueous systems and whose drying assistant comprises from 1 to 20% by weight of a water-soluble sulfo- or sulfonate-functional condensation product formed from aromatic hydrocarbons and formaldehyde. The condensation products involved are, in particular, condensates of phenolsulfonic or naphtalenesulfonic acid with formaldehyde. There is no information on the molecular weight of the condensates used. It is mentioned that the drying of the polymer powders should be undertaken at below the softening point.

EP-A-78 449 describes a process for preparing water-redispersible, blocking-resistant polymer powders by spray drying aqueous dispersions of polymers having glass transition temperatures below 50° C. As spray assistant the dispersions include a water-soluble copolymer of vinylpyrrolidone and vinyl acetate and/or a water-soluble alkali metal salt and/or alkaline earth metal salt of a naphtalenesulfonic acid-formaldehyde condensate. Here again, there is no information on the molecular weight of the naphtalenesulfonic acid-formaldehyde condensates employed. What is evident is the comparatively large amount of spray assistant in the case where the naphtalenesulfonic acid-formaldehyde condensates are used alone (30% by weight in Ex. 4, 50% by weight in Ex. 5, 30% by weight in Ex. 6, based in each case on the polymers). This adversely affects the binder properties of the polymer powders for example by increasing by an undesirable extent the flowability of compositions in which they are used as binder (cf. EP 407 889), or by retarding the setting of cementitious compositions.

Similarly, EP-A-407 889 describes the use of a water-soluble alkali metal salt or alkaline earth metal salt of a phenolsulfonic acid-formaldehyde condensate as a spraying assistant for preparing water-redispersible polymer powders from aqueous polymer dispersions. Yet again, there is no information on the molecular weight of the condensates used. The redispersibility of polymer powders obtained using commercially available phenolsulfonic acid-formaldehyde condensation products, however, gives as little satisfaction as does the powder yield on drying.

It is an object of the present invention to provide drying assistants which permit the preparation, from polymer dispersions, of polymer powders which are readily redispersible in water and which do not have the disadvantages of the prior art.

We have found that this object is achieved, surprisingly, by using phenolsulfonic acid-formaldehyde condensates having a number-average molecular weight $M_n<1500$ as drying assistants.

The present invention therefore relates to the use of phenolsulfonic acid-formaldehyde condensates having a number-average molecular weight $M_n<1500$ daltons or salts thereof as assistants in the drying of aqueous polymer dispersions.

The condensates preferably have mean molecular weights $M_n$ in the range from 500 to 1500, especially from 600 to 1200 daltons, determined by means of gel permeation chromatography, as described in the Examples for the preparation of the spraying assistants. The molecular weight distribution or polydispersity (defined as $M_w/M_n$) is in the range from 5 to 15, preferably from 5 to 11. The proportion of condensates with molar masses above 10,000 daltons is preferably less than 25% by weight, in particular less than 20% by weight, of the overall condensate.

Where the condensate is employed in the form of its salts, the salts normally used are alkali metal salts or alkaline earth metal salts or ammonium salts, ie. salts with ammonia or with organic amines such as triethanolamine, diethanolamine and triethylamine. Preference is given to the alkaline earth metal salts, and especially to the calcium salts.

The drying assistants employed in accordance with the invention are generally prepared by condensation of phenolsulfonic acid with formaldehyde under acidic—especially sulfuric—reaction conditions. In this reaction the phenolsulfonic acid can be introduced as initial charge or can be prepared in situ by sulfonation in accordance with known methods (cf. J. March, Advanced Organic Chemistry, $3^{rd}$ ed., John Wiley, New York 1985, p. 473 ff. and literature cited therein). Phenolsulfonic acid is preferably prepared in situ by sulfonation with sulfuric acid, preferably concentrated sulfuric acid. Condensation takes place by reacting phenolsulfonic acid with formaldehyde under acidic reaction conditions, preferably under sulfuric reaction conditions, and especially in concentrated sulfuric acid. Where the phenolsulfonic acid is prepared in situ, the condensation reaction is initiated by adding formaldehyde to the sulfuric reaction mixture. The molar ratio of formaldehyde to phenolsulfonic acid is in the range from 1:1 to 1:2, preferably 1:1.3 to 1:1.7. Formaldehyde is preferably added in the form of an aqueous solution. In order to establish the desired molecular weight, the condensation reaction is generally conducted at from 90 to 110° C., preferably at about 100° C. The reaction time is generally from 2 to 6 h, preferably from 3 to 5 h. Where it is desired to use the salts as drying assistants, condensation is followed by neutralization using an appropriate basic metal salt or an amine, in which case either metal salt or amine are used preferably in the form of an aqueous solution or dispersion.

The present invention also provides a process for preparing a polymer powder by drying an aqueous polymer dispersion, which involves using at least one phenolsulfonic acid-formaldehyde condensate of the type described above, or a salt thereof, as drying assistant. In the case of alkaline polymer dispersions, the condensates are employed in salt form, but are employed in acid form in the case of acidic polymers.

The amount of drying assistant used is preferably from 1 to 30% by weight, based on the weight of the polymer in the dispersion, preferably from 3 to 15% by weight and, with particular preference, from 5 to 12% by weight.

With particular advantage the novel compounds are used to dry dispersions of polymers whose glass transition temperature (DSC, midpoint temperature, ASTM D 3418-82) is $\leq 65°$ C., preferably $\leq 50°$ C., particularly preferably $\leq 25°$ C. and, with very particular preference, $\leq 0°$ C. The glass transition temperature of the polymers is generally $\geq -60°$ C., preferably $\geq -40°$ C. and, in particular, $\geq -20°$ C.

Against this background it is often useful to estimate the glass transition temperature $T_g$ of the dispersed polymer. According to Fox (T. G. Fox, Bull. Am. Phys. Soc. (Ser. II) 1, 123 [1956] and Ullmanns Encyklopädie der technischen Chemie, Weinheim (1980), p. 17, 18), for the glass transition temperature of copolymers of high molar mass, it holds in good approximation that $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions $1, 2, \ldots, n$ and $T_g^1, T_g^2, \ldots, T_g^n$ are the glass transition temperatures, in kelvins, of homopolymers of each of the monomers $1, 2, \ldots, n$. The individual $T_g$s are known, for example, from Ullmann's Encyclopedia of Industrial Chemistry, VCH, Weinheim, Vol. A 21 (1992) p. 169 and from J. Brandrup, E. H. Immergut, Polymer Handbook $3^{rd}$ ed., J. Wiley, New York 1989.

Preferred polymers are those composed of:

(a) from 80 to 100% by weight of at least one monomer selected from vinyl-aromatic compounds, esters of α,β-monoethylenically unsaturated $C_3$–$C_6$-carboxylic acids and $C_1$–$C_{12}$-alkanols, preferably $C_1$–$C_8$-alkanols, vinyl esters and allyl esters of $C_1$–$C_{12}$-carboxylic acids, and butadiene, and (b) from 0 to 20% by weight of at least one other monomer which has at least one ethylenically unsaturated group.

Here, the expressions $C_n$–$C_m$ refer to the possible—for the purposes of the invention—number of carbons in a particular class of compound. Alkyls may be linear or branched. $C_n$–$C_m$-Alkylaryl are aryls which carry a $C_n$–$C_m$-alkyl.

Examples of vinyl-aromatic compounds are styrene, α-methylstyrene and vinyltoluenes, such as o-vinyltoluene.

The esters of α,β-monoethylenically unsaturated carboxylic acids are, in particular, esters of acrylic, methacrylic, maleic, fumaric and itaconic acid. Examples of such esters are methyl, ethyl, n-butyl, isobutyl, t-butyl, ethylhexyl, decyl and dodecyl (meth)acrylate, dimethyl maleinate, di-n-butylmaleinate and di-n-butylfumarate.

Vinyl and alkyl esters which can be used are vinyl acetate, propionate, n-butyrate, laurate and stearate and the corresponding allyl esters.

Particularly preferred monomers (a) are n-butyl acrylate, tert.-butyl acrylate, 2-ethylhexyl acrylate, methyl methacrylate, tert.-butyl methacrylate, vinyl acetate, vinyl propionate, butadiene and styrene.

The monomers (b) preferably comprise monomers (b') having an increased water solubilty. They are usually selected from the abovementioned α,β-monoethylenically unsaturated $C_3$–$C_6$-carboxylic acids and the nitriles, amides, monoalkylamides, dialkylamides, N-alkylolamides and hydroxyalkyl esters thereof. It is also possible to use as monomers (b') the N-vinyl derivatives of cyclic lactams and the mono- or dialkylaminoalkylamides of the abovementioned $C_3$–$C_6$-carboxylic acids and quaternization products thereof.

Particularly preferred monomers (b') are acrylamide, methacrylamide, acrylic acid, methacrylic acid, acrylonitrile, methacrylonitrile, 2-acrylamido-2-methylpropanesulfonic acid, vinylpyrrolidone, N-methylolacrylamide, N-methylolmethacrylamide, hydroxyethyl acrylate, hydroxyethyl methacrylate, hydroxypropyl acrylate, hydroxypropyl methacrylate, quaternized vinyl-imidazole, N,N-dialkylaminoalkyl(methy)acrylates, N,N-dialkyl-aminoalkyl(meth)acrylamides, trialkylammoniumalkyl(meth)acryl-ates and trialkylammoniumalkyl(meth)acrylamides.

The polymers may also include further monomers (b") in order to give the respective polymer films greater strength. Monomers (b") comprise compounds which have at least two non-conjugated double bonds. Examples of such compounds are the diesters of dihydric alcohols with α,β-monoethylenically unsaturated acids such as ethylene glycol di(meth)acrylate, propylene glycol di(meth)acrylate, 1,3-butylene and 1,4-butylene glycol di(meth)acrylate and 2,2-dimethyl propylene glycol di(meth)acrylate, the vinyl and allyl esters of dicarboxylic acids such as divinyl and diallyl maleate, divinyl and diallyl fumarate, divinyl and diallyl phthalate, divinyl benzene, cyclopentadienylacrylate and -methacrylate, tricyclodecenyl(meth)acrylate, N,N'-divinyl imidazolin-2-one and triallyl cyanurate. Such compounds are generally used in amounts up to 5% by weight of the total monomers.

Further examples of these are siloxane functional monomers such as the vinyltrialkylsiloxanes, for example vinyltrimethoxysilane, alkylvinyldialkoxysilanes or (meth)acryloxyalkyltrialkoxysilanes, for example (meth)acryloxyethyltrimethoxysilane and (meth)acryloxypropyltrimethoxysilane. These siloxane monomers can be used in amounts up to 2 part by weight, preferably from 0.05 to 1 part by weight, based on 100 parts by total weight of monomers.

Preferred polymer dispersions, moreover, are those in which the weight-average diameter $d_w$ of the dispersed polymer particles is $\geq 100$ nm, particularly preferably $\geq 300$ nm. Normally, $d_w$ is $\leq 2000$ nm. It is also favorable if the diameters of the dispersed polymer particles are spread over a broad diameter range.

The $d_w$ of the particle size is, conventionally, defined as the weight average of the particle size, as determined using an analytical ultracentrifuge in accordance with the method of W. Scholtan and H. Lange, Kolloid-Z. und Z.-Polymere 250 (1972) pp. 782–796. The ultracentrifuge measurement provides the integral mass distribution of the particle diameter of a sample. From this it is possible to derive what percentage by weight of the particles have a diameter equal to or less than a particular size.

An appropriate measure of the width of the diameter distribution is the quotient $Q = (d_{90} - d_{10})/d_{50}$, where $d_m$ is the diameter not exceeded by m% by weight of the dispersed polymer particles. Q is preferably from 0.5 to 1.5. The preparation of polymer dispersions having such a breadth of particle distribution is familiar to the skilled worker, for example from DE-A-43 07 683.

The ratio of weight-average molecular weight $M_w$ to number-average molecular weight $M_n$ of the polymers can be from 1 to 30 or from 1 to 20 or from 1 to 8. Accordingly, the molecular weight can be essentially uniform or can be distributed over a certain breadth.

The preparation of the polymer dispersions that are to be dried is known. They are generally prepared by free-radical polymerization, preferably in polar solvents and especially in water. To establish the desired molecular weight it is possible to add substances which regulate the molecular weight. Examples of suitable molecular weight regulators are compounds containing a thiol group and/or a silane group (examples being t-dodecyl mercaptan, n-dodecyl mercaptan and mercaptopropyltrimethoxysilane), allyl alcohols and aldehydes, such as formaldehyde, acetaldehyde, etc.

Examples of suitable initiators are inorganic peroxides, such as sodium peroxodisulfate, or azo compounds. Solution or emulsion polymerization can be carried out depending on the monomer composition.

If the polymer dispersion is prepared by emulsion polymerization, it is carried out conventionally. A protective colloid is generally used, such as polyvinyl alcohol, polyvinyl pyrrolidone or cellulose derivatives, or anionic and/or nonionic emulsifiers, such as ethoxylated mono-, di- or trialkylphenols, ethoxylated fatty alcohols, and alkali metal or ammonium salts of $C_8$–$C_{12}$-alkyl sulfates, sulfuric monoesters of ethoxylated $C_{12}$–$C_{18}$-alkanols, $C_{12}$–$C_{18}$-alkylsulfonic acids, $C_9$–$C_{18}$-alkylarylsulfonic acids and sulfonated alkyldiphenyl ethers. Polymerization is generally carried out at from 50 to 120° C., in particular from 70 to 100° C.

The emulsion polymerization might be carried out by the seed latex technique in order to adjust particle size and particle size distribution. The seed latex might be preformed or be prepared in situ. Techniques for doing this are known and can be found in prior art (see EP-B 40 419, EP 129 699, EP-A 567 811, EP-A 567 812, EP-A 567 819, DE-A 31 47 008, DE-A 42 13 967 and DE-A 42 13 968 which are incorporated herein by reference). In another embodiment of the present invention the polymer dispersion is carried out in the absence of a seed latex. In this case, particle size can be adjusted by surface active substances such as protective colloids or emulsifiers.

The dispersion itself may be a primary dispersion, ie. a polymer dispersion obtained directly by the method of free-radical aqueous emulsion polymerization. Alternatively, it may be a secondary dispersion; in other words, a polymer obtained by solution polymerization is subsequently converted into an aqueous polymer dispersion.

The polymer dispersion can be dried in a customary manner, for example by freeze drying or, preferably, by spray drying. In the case of spray drying, a procedure is used in which the stream of hot air enters at from 100 to 200° C., preferably from 120 to 160° C., and exits at from 30 to 90° C., preferably from 60 to 80° C. Spraying the aqueous polymer dispersion in the stream of hot air can be effected, for example, by means of single-substance or multi-substance nozzles or using a rotating disk. The polymer powders are normally separated off using cyclones or filter separators. The sprayed aqueous polymer dispersion and the stream of hot air are preferably conducted in parallel.

The phenolsulfonic acid-formaldehyde condensates used in accordance with the invention can be added in the form of an aqueous solution or as a solid, prior to drying, to the dispersion that is to be dried. Where the latter is a primary dispersion, the drying assistant can be added before, during and/or after emulsion polymerization.

In addition to the novel drying assistants it is also possible, as well, to use known drying assistants, such as polyvinyl alcohol, polyvinyl pyrrolidone, naphtalene-sulfonic acid-formaldehyde condensates, homopolymers of 2-acrylamido-2-methylpropanesulfonic acid, etc. Anticaking agents, such as highly disperse silica, which is normally used for the drying of aqueous polymer dispersions, may be employed in order to prevent the polymer powder caking together in the course of storage. In the case of spray drying, the anticaking agents are generally fed in through a separate nozzle.

The present invention also provides polymer powders obtainable in accordance with the invention. These are suitable as binders in hydraulically setting compositions, paints, lacquers, adhesives, coating compositions (especially for paper) and synthetic-resin renders, as are described in EP-A-629 650.

The polymer powders obtainable in accordance with the invention are particularly suitable for the modification of binding mineral building materials (mortar-like formulations) which comprise a mineral binder consisting of 70–100% by weight cement and 0–30% by weight gypsum. This applies, in particular, where cement is used as the only mineral binder. In this context, the novel effect is essentially independent of the type of cement. Depending on the project at hand, therefore, it is possible to use blast furnace slag cement, oil shale cement, Portland cement, hydrophobicized Portland cement, quick-setting cement, high-expansion cement or high-alumina cement, the use of Portland cement proving particularly advantageous. See DE-A 19623413.3 for further information.

The dry compositions of binding mineral building materials typically include, based on the amount of mineral binder, from 0.1 to 20% by weight of modifying polymer powder.

Cellulose derivatives and microsilica are frequently added to the binding mineral building materials in order to improve their processing properties. The former additives usually have a thickening action, while the latter normally constitute thixotropic agents which bring about a further reduction in the flowability of the aqueous mortar prior to its solidification in the applied, at-rest state. Calcium carbonate and quartz sand generally make up the remaining aggregates. By adding defoamers (preferably in powder form in the context of dry mortars) it is possible to obtain, in the solidified state, a solidified cementitious mortar with an air pore content appropriate to the field of use (from 5 to 20% by volume).

The polymer powders obtainable in accordance with the invention are suitable, for example, for modifying cementitious repair mortars or reinforcing mortars. In this context, customary reinforcing mortars additionally include natural or synthetic fibers of materials such as, for example, Dralon (length for example from 1 to 10 mm, linear density for example from 3 to 10 dtex) in order to increase their crack-bridging capability.

The amount of modifying polymer powder added to the cementitious reinforcing mortar will be, based on cement content, from 9 to 20% by weight for extremely high crack-bridging requirements and from 4 to 9% by weight for lesser crack-bridging requirements.

Only in the case of particularly low crack-bridging requirements will the amount of modifying polymer powder added be limited, again based on cement content, to the range from 0.1 to 4% by weight.

Typical reinforcing mortars consist, as a dry preparation of binding mineral building material, of from 20 to 60, preferably from 20 to 50, % by weight of mineral binder (preferably exclusively cement), from 0.1 to 20, frequently from 0.1 to 10, % by weight of modifying polymer powder obtainable in accordance with the invention, up to 25% by weight of customary auxiliaries (such as defoamers or thickeners) and, as the remainder, aggregates such as, for example, sand, fillers (eg. $CaCO_3$), pigments (eg. $TiO_2$) and natural and/or synthetic fibers.

The Examples which follow illustrate the invention without restricting it.

EXAMPLES

1. Preparing the dispersions 1.1 Dispersion D1

A mixture of 150 g of water, 5.6 g of a 20% strength by weight aqueous solution of an ethoxylated p-isooctylphenol (EO degree 25), 0.48 g of a 35% strength by weight aqueous solution of an Na salt of a sulfated and ethoxylated p-isooctylphenol (EO degree 25), 3.9 g of 10% strength by weight aqueous formic acid, 1.7 g of sodium bicarbonate and 3.4 g of a 20% strength by weight aqueous polyacrylamide solution was heated to 90° C. To this mixture there were then added, beginning at the same time and while maintaining the internal temperature of 90° C., 742.8 g of an aqueous monomer emulsion consisting of 403.2 g of n-butyl acrylate, 140.0 g of styrene, 11.2 g of acrylamide, 5.6 g of methacrylamide, 8.4 g of a 20% strength by weight aqueous solution of an ethoxylated p-isooctylphenol (EO degree 25), 11.5 g of a 35% strength by weight aqueous solution of an Na salt of a sulfated and ethoxylated p-isooctylphenol (EO degree 25) and 162.9 g of water over the course of 2 h, and a solution of 3.3 g of sodium peroxodisulfate in 90 g of water, over the course of 2.5 h, both the emulsion and the solution being added dropwise and continuously. The reaction mixture was subsequently stirred at 90° C. for 120 minutes and then cooled to 60° C. Following the addition of a solution of 1.1 g of t-butylhydroperoxide in 5.5 g of water, a solution of 0.6 g of sodium hydroxymethanesulfinate in 15 g of water was added at 60° C. over the course of 1 h, and stirring was continued for 0.5 h. After 15 minutes, the reaction mixture was cooled to room temperature and neutralized with 4 ml of a 20% by weight suspension of calcium hydroxide in water. Filtration gave a dispersion having a solids content of 55.3%, a light transmittance value for a 0.01% by weight dispersion at 20° C. and a path length of 2.5 cm (LT) of 8%, and a pH of 8.7. The glass transition temperature (DSC-midpoint, see above) of the polymer was −15° C.

1.2 Dispersion D2

The procedure employed for dispersion D1 was repeated, except that the monomer emulsion feed stream consisted of 291.2 g of n-butyl acrylate, 252.0 g of styrene, 11.2 g of acrylamide, 5.6 g of methacrylamide, 8.4 g of a 20% strength by weight aqueous solution of an ethoxylated p-isooctylphenol (EO degree 25), 11.5 g of a 35% strength by weight aqueous solution of an Na salt of a sulfated and ethoxylated p-isooctylphenol (EO degree 25) and 162.9 g of water and, for neutralization, the 4 ml of a 20% by weight suspension of calcium hydroxide in water were replaced by 3.5 g of 10% strength by weight aqueous ammonia. Filtration gave a dispersion having a solids content of 55.4%, a light transmittance value LT of 9% for a 0.01% by weight dispersion at 20° C. and a path length of 2.5 cm, and a pH of 7.3. The glass transition temperature (DSC-midpoint, see above) of the polymer was +15° C.

1.3 Dispersion D3

The procedure employed for dispersion D1 was repeated, except that the monomer emulsion feed stream consisted of 487.2 g of n-butyl acrylate, 56.0 g of styrene, 11.2 g of acrylamide, 5.6 g of methacrylamide, 8.4 g of a 20% strength by weight aqueous solution of an ethoxylated p-isooctylphenol (EO degree 25), 11.5 g of a 35% strength by weight aqueous solution of an Na salt of a sulfated and ethoxylated p-isooctylphenol (EO degree 25) and 162.9 g of water.

Filtration gave a dispersion having a solids content of 52.7%, a light transmittance value LT of 10%, and a pH of 7.9. The glass transition temperature (DSC-midpoint, see above) of the polymer was −28° C.

1.4 Dispersion D4

In a polymerization vessel, a mixture of 500 g of water, 2.5 g of sodium acetate, 2.5 g of butanol and 10 g of ethoxylated cellulose (Natrosol® 250 GR)

was heated to the polymerization temperature of 80° C. Then, all in one portion, first 150 g of feedstream I and then 10 g of feedstream II were introduced into the polymerization vessel, and the batch was polymerized at 80° C. for 20 minutes. Subsequently, beginning at the same time, the remainder of feedstream I was metered in continuously over the course of 3 h and the remainder of feedstream II over the course of 3.5 h, while the temperature was maintained at 80° C. This was followed by stirring at 80° C. for 1 h more, before the mixture was cooled to room temperature.

The solids content of the resulting aqueous polymer dispersion was 50.2% by weight. Its pH was 4 and the LT (25° C.) was 20% (0.01% strength by weight dilution). The dispersed polymer had a glass transition temperature of −2° C. (DSC-midpoint, see above).

Feedstream I:
- 600 g of vinyl propionate
- 200 g of tert-butyl acrylate
- 200 g of n-butyl acrylate
- 160 g of a mixture of 150 g of emulsifier solution (20% strength by weight aqueous solution of ethoxylated p-isooctylphenol having an EO degree of 25) and 10 g of a block copolymer of ethylene oxide and propylene oxide (molar ratio EO:PO=0.7 and relative number-average molecular weight=3200) and
- 343 g of water Feedstream II:
- 5 g of sodium peroxodisulfate in 100 g of water.

1.5. Dispersion D5

In a polymerization vessel, a solution of
- 6000 g of water and
- 17 g of a 45% strength by weight aqueous solution of the surfactant corresponding to Dowfax 2A1 was heated to the polymerization temperature of 80° C. Subsequently, all in one portion, 1087 g of feedstream I and 108 g of feedstream II were added in succession to the polymerization vessel, and the batch was polymerized at 80° C. for 30 minutes. Subsequently, while maintaining the polymerization temperature, the remainder of feedstreams I and II were supplied continuously over the course of 3.5 h, beginning at the same time. The reaction mixture was subsequently left at 80° C. for 4 h. Finally, it was cooled to room temperature and neutralized with 420 g of 25% strength by weight aqueous sodium hydroxide.

The solids content of the resulting aqueous polymer dispersion was 50.9%. Its pH was 8 and the LT (25° C.) was 46% (0.01% strength by weight dilution). The dispersed polymer had a glass transition temperature of 60° C. (DSC-midpoint).

Feedstream I:
- 12,150 g of styrene
- 2250 g of butadiene
- 450 g of a 50% strength aqueous solution of acrylamide
- 375 g of acrylic acid
- 120 g of tert-dodecylmercaptan
- 117 g of a 45% strength by weight aqueous solution of the surfactant corresponding to Dowfax 2A1
- 250 g of a 15% strength by weight aqueous solution of the sodium salt of the sulfuric monoester of lauryl alcohol, and
- 6033 g of water.

Feedstream II:
- 150 g of sodium peroxodisulfate and
- 200 g of water.

2. Preparing the spray assistants 2.1 Spray assistant S1

1.147 kg of phenol were charged at 60° C. to a reaction vessel, and, while cooling, 1.38 kg of concentrated sulfuric acid were added such that the internal temperature remained below 110° C. After the end of this addition, reaction was allowed to continue at an internal temperature of from 105 to 110° C. for 3 h. The reaction mixture was cooled to 50° C. and, while maintaining an internal temperature of from 50 to 55° C., 0.84 kg of a 30% strength by weight aqueous formaldehyde solution was added in portions. After the end of the addition, 0.75 kg of deionized water were added immediately, and the mixture was heated to 95–100° C. and further reacted at this temperature for 4 h. It was cooled to 60° C., and a further 0.83 kg of deionized water was added. At a precipitation temperature of 65° C., 2.25 kg of a 35% by weight calcium hydroxide slurry in deionized water were added; the mixture was cooled to room temperature and filtered through a 200 µm sieve. The pH of the resulting 35% strength by weight solution was 8.2.

2.2 Spray assistant SV2

The procedure employed for S1 was repeated, but the condensation time at from 95 to 100° C. was now 6.5 h (rather than 4 h in the case of S1). The pH of the resulting 34% strength by weight solution was 7.8.

The spray assistants were differentiated on the basis of their molecular weights as determined by gel permeation chromatography. This was carried out on 3 serial columns (1=300 mm, d=8 mm) which were fitted with a 10µ filter and packed with polymers of defined porosity (HEMA BIO from Polymer Standards Service GmbH, Mainz, with 40, 100 and 1000 Å). The mobile phase used was a mixture of 60% by weight of a 0.1 M solution of sodium nitrate, 30% by weight of tetrahydrofuran (analytical grade) and 10% by weight of acetonitrile (analytical grade). As an internal standard for flow correction, 1% of acetone was added. The samples were diluted with deionized water to a solids content of 0.5% by weight and chromatographed at a flow rate of 1.50 ml/min and at 60° C. Detection was by UV spectrometry at a wavelength of 254 nm. Calibration used polystyrene sulfonates (Na salt, N=1370–1,010,000 daltons) and also naphthalenemono-, -di- and -trisulfonic acid sodium salts. The results are compiled in Table 1.

TABLE 1

| Drying assistant | $M_n$ [g/mol] | $M_w$ [g/mol] | $M_w/M_n$ | m > 10,000 g/mol [% by wt.][2] |
|---|---|---|---|---|
| S1 | 750 | 8000 | 10.7 | 14 |
| SV2[1] | 2100 | 31,000 | 14.8 | 55 |

[1]Comparison drying assistant
[2]Proportion of condensates with molar masses above 10,000 g/mol 3. Preparing the novel and the comparison polymer powders:

To prepare the dry polymer powders, the polymer dispersions were diluted to a solids content of 40% and the spray assistants to a solids content of 20%. The dispersion was then added to the spray assistant, rapidly and with vigorous stirring, and the mixture was if necessary adjusted to a solids content of 35% using deionized water. Spray drying took place in a Minor laboratory dryer from GEA Wiegand GmbH (Niro Business Unit) with atomization by disk or dual-substance nozzle at a tower entry temperature of 130° C. and a tower exit temperature of 60° C. (performance: about 2 kg of spray feed/h). As an antiblocking agent, about 2.0–3.0% by weight (based on solid polymer mixture) of a finely divided silica were metered into the drying chamber at the same time as the spray feed. Proportions, drying conditions, and results are summarized in Table 2.

The redispersibility of the polymer powders was investigated as described below:

90 g of deionized water are measured out into a glass bottle, and 10 g of powder are added. The mixture is stirred at 9500 rpm for 1 minute using an Ultra-Turrax and is placed in a measuring cylinder. The measuring cylinder is closed with a plastic stopper and stored at rest for 72 h. The redispersion is subsequently shaken thoroughly and filtered through a 72 μm sieve. The sieve is placed in a drying oven at 80° C. for 12 h, and the percentage of dry coagulum is determined on the basis of the initial mass of powder (10 g).

TABLE 2

Results of spray drying

| Powder | Dispersion | Spray assistant[a] | Wall deposit | Powder yield | Redispersibility[b] Coagulum[c] | Settlings[d] |
|---|---|---|---|---|---|---|
| P1 | D1 | 7 p. of S1 | minimal | 84% | 0.1% | 1% |
| P2 | D2 | 7 p. of S1 | " | 76% | 0.03% | 0% |
| P3 | D3 | 7 p. of S1 | " | 81% | 0.2% | 2% |
| P4 | D4 | 7 p. of S1 | " | 77% | 0.4% | 5% |
| P5 | D5 | 7 p. of S1 | " | 80% | 0.3% | 6% |
| PV6 | D2 | 7 p. of SV2 | slight | 72% | 1.1% | 15% |

[a] parts by weight (p.) of solid spray assistant, based on 100 p. of dispersion solids
[b] at a solids content of 10% after 72 h
[c] coagulum filtered off a 72 μm sieve, dried at 80° C. overnight, in comparison with amount of redispersed powder
[d] based on 100 ml redispersion

[a] parts by weight (p.) of solid spray assistant, based on 100 p. of dispersion solids
[b] at a solids content of 10% after 72 h
[c] coagulum filtered off on a 72 μm sieve, dried at 80° C. overnight, in comparison with amount of redispersed powder
[d] based on 100 ml redispersion

What is claimed is:

1. A process for drying aqueous polymer dispersions, comprising:
   adding to an aqueous polymer dispersion to be dried as a drying assistant at least one phenolsulfonic acid-formaldehyde condensate having a number-average molecular weight, $M_n$, <1500 daltons or a salt thereof, and
   drying the polymer dispersion.

2. A process as claimed in claim 1, wherein the phenolsulfonic acid-formaldehyde condensate has a number-average molecular weight, $M_n$, of from 600 to 1200 daltons and a distribution $M_w/M_n$ of from 5 to 15.

3. A process as claimed in claim 1, wherein the proportion of the phenolsulfonic acid-formaldehyde condensate having a molar mass above 10,000 daltons is less than 25% by weight of the total amount of the condensate.

4. A process as claimed in claim 1, wherein the polymer in the dispersion has a glass transition temperature below 65° C.

5. A process as claimed in claim 1, wherein the polymer in the dispersion is composed of (a) from 80 to 100% by weight of at least one monomer selected from the group consisting of vinyl-aromatic compounds, esters of α,β-unsaturated $C_3$–$C_6$-carboxylic acids or $C_4$–$C_8$-dicarboxylic acids with $C_1$–$C_{12}$-alkanols, vinyl esters or allyl esters of $C_1$–$C_{12}$-carboxylic acids, and butadiene, and (b) from 0 to 20% by weight of at least one additional monomer which has at least one ethylenically unsaturated bond.

6. A process as claimed in claim 1, wherein the polymer is spray dried.

7. A process as claimed in claim 5, wherein the monomer (b) is selected from (meth)acrylic acid, (meth)acrylamide, (meth)acrylonitrile, acrylamido-2-methylpropanesulfonic acid, vinylpyrrolidone, hydroxyethyl(meth)acrylate, and hydroxypropyl(meth)acrylate.

8. A process as claimed in claim 5, wherein the monomer (a) is selected from the group of consisting of n-butyl acrylate, tert-butyl acrylate, 2-ethylhexyl acrylate, methyl methacrylate, tert-butylmethacrylate, vinyl acetate, vinyl propionate, butadiene, and styrene.

9. A process as claimed in claim 8, wherein the entry temperature of the stream of hot air is from 100 to 200° C. and the exit temperature is from 60 to 80° C.

10. A polymer powder obtainable by a process as claimed in claim 1.

11. A polymer powder as claimed in claim 10, comprising a polymer dispersion, wherein the polymer dispersion having a glass transition temperature below 65° C.

12. A composition selected from the group consisting of hydraulically setting compositions, paints, lacquers, adhesives, coating compositions and synthetic-resin renders and for modifying mineral building materials, wherein the composition contains as a binder a polymer powder as claimed in claim 11.

13. A binding mineral building material comprising a polymer powder as claimed in claim 11.

14. A binding mineral building material as claimed in claim 13, in the form of a dry mortar formulation consisting of:
   from 20 to 60% by weight of mineral binder,
   from 0.1 to 20% by weight of a polymer powder as claimed in claim 10,
   up to 25% by weight of customary auxiliaries, and,
   as the remainder, aggregates.

15. The material as claimed in claim 14, wherein the aggregates are selected from the group consisting of sand, fillers, pigments, natural fibers, and synthetic fibers.

* * * * *

UNITED STATES PATENT AND TRADEMARK OFFICE
CERTIFICATE OF CORRECTION

PATENT NO. : 6,028,167
DATED : February 22, 2000
INVENTOR(S) : Joachim Pakusch et al.

It is certified that error appears in the above-identified patent and that said Letters Patent is hereby corrected as shown below:

<u>Title page,</u>
Item [56], U.S. PATENT DOCUMENTS, insert the followings:

| | | | | |
|---|---|---|---|---|
| -- 5,430,092 | 07/04/95 | Oral AYDIN, et al. | 524 | 458 |
| 5,350,787 | 09/27/94 | Oral AYDIN, et al. | 524 | 162 |
| 5,340,858 | 08/23/94 | Gerhard BAUER, et al. | 524 | 162 |
| 5,426,146 | 06/20/95 | Oral AYDIN, et al. | 524 | 468 |
| 4,456,726 | 06/26/84 | Werner SIOL, et al. | 524 | 501 |
| 5,624,992 | 04/29/97 | Oral AYDIN, et al. | 524 | 468 |
| 5,442,006 | 08/15/95 | Oral AYDIN, et al. | 524 | 457 |
| 5,352,720 | 10/04/94 | Oral AYDIN, et al. | 524 | 162 |
| 5,340,859 | 08/23/94 | Oral AYDIN, et al. | 524 | 162 |
| 5,436,289 | 07/25/95 | Oral AYDIN, et al. | 524 | 457 |
| 5,462,978 | 10/31/95 | Erich PENZEL, et al. | 524 | 3 -- |

FOREIGN PATENT DOCUMENTS, insert the followings:

| | | |
|---|---|---|
| -- 78,449 | | EUROPE (corr abstract of DE 31 43 070) |
| 31 43 070 | 05/11/83 | GERMANY (English abstract only) |
| 43 07 683 | | GERMANY (corr US-5,430,092) |
| 567 811 | | EUROPE (corr US-5,350,787) |
| 567 812 | | EUROPE (corr US-5,340,858) |
| 31 47 008 | | GERMANY (corr US-4,456,726) |
| 42 13 967 | | GERMANY (corr US-5,624,992; US-5,442,006; US-5,352,720) |
| 42 13 968 | | GERMANY (corr US-5,340,859 and US-5,436,289) |
| 629 650 | | EUROPE (corr US-5,462,978) |
| 0 040 419 | 11/25/81 | EUROPE (with English claims) |
| 0 129 699 | 01/02/85 | EUROPE (with English claims) |

UNITED STATES PATENT AND TRADEMARK OFFICE
CERTIFICATE OF CORRECTION

PATENT NO. : 6,028,167
DATED : February 22, 2000
INVENTOR(S) : Joachim Pakusch et al.

It is certified that error appears in the above-identified patent and that said Letters Patent is hereby corrected as shown below:

Title page (cont'd),
OTHER PUBLICATIONS, insert the followings:
-- Database WPI, Derwent Publications, AN 98-043241/05, DE 19623413, December 18, 1997
J. MARCH, Advanced Organic Chemistry, $3^{rd}$ ed., p. 473-475, "REACTIONS" 1985
T.G. FOX, Bull. Am. Phys. Soc. (Ser.II) 1, pg.123, "INFLUENCE OF DILUENT AND OF COPOLYMER COMPOSITION ON THE GLASS TEMPERATURE OF A POLYMER SYSTEM", 1956
Ullmanns Encyclopedia of Tech. Chem., Vol. 19, pp. 17-20, "POLYACRYL-UND POLYMETHACRYL-VERBINDUNGEN", 1992
Ullmanns Encyclopedia of Ind. Chem., Vol. A 21, pp. 169-171, "POLYARCYLATES", 1992
J. BRANDRUP, et al., Polymer Handbook, $2^{nd}$ ed., 3 pages, "TABLE OF CONTENTS", 1989
W. SCHOLTAN, et al., Kolloid-Z und Z. Polymere 250, pp. 782-796, "BESTIMMUNG DER TEILCHENGRÖBENVERTEILUNG VON LATICES MIT DER ULTAZENTRIFUGE", 1972 --

Signed and Sealed this

Thirteenth Day of January, 2004

JON W. DUDAS
*Acting Director of the United States Patent and Trademark Office*